US010023152B2

(12) United States Patent
Dudar et al.

(10) Patent No.: US 10,023,152 B2
(45) Date of Patent: Jul. 17, 2018

(54) METHOD OF PREVENTING A WINDSHIELD WIPER FROM FREEZING TO A WINDSHIELD AND RELATED CIRCUIT

(71) Applicant: FORD GLOBAL TECHNOLOGIES, LLC, Dearborn, MI (US)

(72) Inventors: Aed M. Dudar, Canton, MI (US); Mahmoud Yousef Ghannam, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/197,063

(22) Filed: Jun. 29, 2016

(65) Prior Publication Data

US 2018/0001872 A1    Jan. 4, 2018

(51) Int. Cl.
*G05B 5/00* (2006.01)
*H02P 1/04* (2006.01)
*B60S 1/08* (2006.01)
*H02P 1/18* (2006.01)

(52) U.S. Cl.
CPC ........... *B60S 1/0866* (2013.01); *B60S 1/0818* (2013.01); *H02P 1/18* (2013.01); *B60S 1/08* (2013.01)

(58) Field of Classification Search
None
See application file for complete search history.

(56) References Cited

U.S. PATENT DOCUMENTS

| | | | | |
|---|---|---|---|---|
| 4,866,359 A | * | 9/1989 | Schmid | B60S 1/08 318/471 |
| 5,086,260 A | * | 2/1992 | Ito | B60S 1/08 15/250.13 |
| 5,729,104 A | | 3/1998 | Kamishima et al. | |
| 5,932,983 A | | 8/1999 | Maue et al. | |

(Continued)

FOREIGN PATENT DOCUMENTS

| CA | 2245298 C | 10/2005 |
|---|---|---|
| CN | 203601217 U | 5/2014 |

(Continued)

OTHER PUBLICATIONS

English Machine Translation of CN203601217U.

(Continued)

*Primary Examiner* — Bentsu Ro
*Assistant Examiner* — Zemenay Truneh
(74) *Attorney, Agent, or Firm* — Jason Rogers; King & Schickli, PLLC (57) ABSTRACT

A method of preventing a windshield wiper from freezing to a windshield of a vehicle is provided. The method broadly includes the steps of: (a) receiving information relating to an ambient condition of the vehicle; (b) switching power to a motor for driving the windshield wiper in a first direction if the received information indicates an adverse ambient condition of the vehicle; (c) sensing current drawn by the motor; (d) comparing an initial sensed current drawn by the motor when power is initially switched to the motor to a subsequent sensed current drawn by the motor a period after power is initially switched to the motor; and (e) periodically reversing the motor for driving the windshield wiper in a second direction or the first direction until the subsequent sensed current is less than the initial sensed current.

20 Claims, 6 Drawing Sheets

(56) References Cited

U.S. PATENT DOCUMENTS

| | | | |
|---|---|---|---|
| 6,148,470 A * | 11/2000 | Buchanan, Jr. | B60S 1/245 15/250.27 |
| 6,150,639 A * | 11/2000 | Ruan | B60S 1/0818 219/494 |
| 6,369,358 B1 | 4/2002 | Blessing et al. | |
| 6,696,808 B2 * | 2/2004 | Schmid | B60S 1/0818 318/280 |
| 7,294,986 B2 * | 11/2007 | Marentette | B60S 1/08 318/443 |
| 7,301,296 B1 * | 11/2007 | Discenzo | G05B 19/4063 318/400.01 |
| 2012/0227205 A1 | 9/2012 | Maier et al. | |

FOREIGN PATENT DOCUMENTS

| | | |
|---|---|---|
| DE | 19901028 A1 | 7/2000 |
| EP | 1507138 B1 | 2/2005 |
| JP | 2003154924 A | 5/2003 |
| JP | 2009107598 A | 5/2009 |

OTHER PUBLICATIONS

English Machine Translation of DE19901028A1.
English Machine Translation of JP2003154924A.
English Machine Translation of JP2009107598A.

* cited by examiner

METHOD OF PREVENTING A WINDSHIELD WIPER FROM FREEZING TO A WINDSHIELD AND RELATED CIRCUIT

TECHNICAL FIELD

This document relates generally to windshields, and more specifically to a method of preventing windshield wipers from freezing to a windshield of a vehicle.

BACKGROUND

It is well known that windshield wipers can become stuck, or frozen, to a vehicle windshield in certain inclement weather. Vehicle operators who park their vehicles outdoors at night or during the day often find their vehicle covered in snow and/or ice. In these situations, clearing the windshield of the snow and/or ice is not always sufficient to unstick the windshield wipers from the windshield. Typically, the vehicle operator will have to physically move the windshield wiper to overcome the retentive force created by the snow and/or ice. In addition to being a nuisance for the vehicle operator, physically moving the windshield wiper can also result in damage to the windshield wipers or wiper blades.

In other scenarios, the vehicle owner may start the vehicle allowing it time to warm up and at least partially clear the windshield. This may be done utilizing a remote vehicle start function or manually. In such scenarios, the vehicle operator turns on a rear window heater and a defroster to warm the front windshield. Typically, however, the vent through which the warm air blows onto the front windshield in the defrost mode contacts the window above a zone of the windshield where the windshield wipers typically reside when not in use, in other words, the defroster only warms a portion of the windshield excluding a windshield wiper park zone. Again, the windshield may be substantially cleared of snow and/or ice by the defroster but the windshield wiper may remain frozen to the windshield within the windshield wiper park zone.

Although mechanisms have been developed to warm the windshield wiper park zone, these mechanisms are limited primarily to a pre-warming sequence or a sequence which remains on throughout the entire time the vehicle is running. In other words, warming of the windshield wiper park zone whether for a pre-warming period or the entire time the vehicle is running is only initiated by the vehicle owner starting the vehicle, whether manually or remotely, to allow the vehicle time to warm up and at least partially clear the windshield.

While these mechanisms have proven useful in these scenarios to warm the windshield wiper park zone sufficient to release the windshield wipers from the windshield, they each suffer from certain drawbacks. The pre-warming sequence, for example, does not account for scenarios where the windshield wiper park zone refreezes after the pre-warming period elapses and the windshield wipers become stuck during operation of the vehicle. In such a scenario, the vehicle operator has to cease operating the vehicle to address the issue manually, continue operating the vehicle without windshield wiper function, restart the car in order to re-engage the pre-warming sequence, or engage a human machine interface (HMI) to initiate a new warming sequence if the particular vehicle has an HMI. The warming sequence which occurs throughout the entire period of time the vehicle is operating likewise has drawbacks. Primarily, the continuous warming sequence consumes a significant amount of current throughout the sequence. Some, or even most, of this current consumption could be occurring during periods where warming is no longer required due to ambient temperature increases and/or a lack of need for windshield wiper function.

Accordingly, a need exists for a way to prevent a windshield wiper from freezing to a windshield in the first instance which eliminates the need for a pre-warming sequence, a continuous sequence, or manually engaged sequences utilizing HMI. Ideally, a preventative sequence would be initiated when ambient conditions of the vehicle are adverse indicating or even suggesting the possibility of precipitation or other adverse condition. Adverse conditions may include any indicator of precipitation including, for example, an ambient temperature near or below freezing, actual precipitation falling as sensed by a rain sensor, a humidity sensor, or information obtained from a camera mounted to the vehicle or otherwise. Even more, information concerning weather obtained from another source such as a radio, a computer, a receiver, or a mobile device, or applications supported thereby, may be used to initiate a preventative sequence when ambient conditions indicate or suggest the possibility of precipitation or other adverse condition.

Such a preventative sequence would be required to occur prior to freezing which could result in false positives. Accordingly, the sequence should be able to determine whether the windshield wiper is frozen to the windshield and to adjust the sequence accordingly. The sequence could also extend until the ambient conditions are no longer adverse, i.e., they are sufficient to avoid freezing.

SUMMARY OF THE INVENTION

In accordance with the purposes and benefits described herein, a method is provided of preventing a windshield wiper from freezing to a windshield of a vehicle. The method may be broadly described as comprising the steps of: receiving information relating to an ambient condition of the vehicle; switching power to a motor for driving the windshield wiper in a first direction if the received information indicates an adverse ambient condition of the vehicle; sensing current drawn by the motor; comparing an initial sensed current drawn by the motor when power is initially switched to the motor to a subsequent sensed current drawn by the motor a period after power is initially switched to the motor; and periodically reversing the motor for driving the windshield wiper in a second direction or the first direction until the subsequent sensed current is less than the initial sensed current.

In one possible embodiment, an initial subsequent sensed current is sensed after an initial period sufficient in duration to allow the windshield wiper to move from an initial stationary position.

In another possible embodiment, the step of periodically reversing the motor is terminated after the first reversing step when the initial subsequent sensed current is less than the initial sensed current, and further comprising the step of switching power from the motor when the windshield wiper returns to the initial stationary position.

In still another possible embodiment, the step of receiving information includes at least one of the steps of monitoring a temperature sensor, monitoring a humidity sensor, monitoring a rain sensor, monitoring information from a camera, monitoring information from weather related applications, and monitoring data from telematics or vehicle-to-external communications systems.

In yet another possible embodiment, the step of periodically reversing the motor includes the step of reversing a polarity of the power applied to the motor for driving the windshield wiper in the first direction or the second direction.

In another possible embodiment, the step of periodically reversing the motor is terminated when the subsequent sensed current is less than the initial sensed current. In one additional embodiment, the method further includes the step of switching power from the motor when the windshield wiper returns to the initial stationary position.

Another possible method of preventing a windshield wiper from freezing to a windshield of a vehicle may be broadly described as comprising the steps of: driving the windshield wiper in a first direction; sensing current drawn by a motor for driving the windshield wiper; comparing an initial sensed current to a subsequent sensed current; and periodically reversing a direction the windshield wiper is driven until the subsequent sensed current is less than the initial sensed current.

In one possible embodiment, the step of driving the windshield wiper in the first direction includes driving the windshield wiper from an initial stationary position, and wherein an initial subsequent sensed current is a holding current sensed after an initial inrush current sufficient to move the windshield wiper from the initial stationary position.

In another possible embodiment, the step of periodically reversing the motor is terminated after the first reversing step when the initial subsequent sensed current is less than the initial sensed current.

In yet another possible embodiment, the method further includes the step of receiving information relating to an ambient condition of the vehicle, and the step of driving the windshield wiper in the first direction occurs only if the information received relates to an adverse ambient condition of the vehicle.

In still another possible embodiment, the step of periodically reversing the motor is terminated when the subsequent sensed current is less than the initial sensed current.

In one other possible embodiment, the method further includes the step of stopping the windshield wiper upon its return to the initial stationary position following termination of the step of periodically reversing the motor.

In still another possible embodiment, the method further includes the step of receiving information relating to an ambient condition of the vehicle, and wherein the step of driving the windshield wiper in the first direction occurs only if the information received relates to an adverse ambient condition of the vehicle. In yet another, the step of receiving information includes at least one of the steps of monitoring a temperature sensor, monitoring a humidity sensor, monitoring a rain sensor, monitoring information from a camera, and monitoring information from weather related applications, and monitoring data from telematics or vehicle-to-external communications systems.

In another possible embodiment, a circuit for preventing a windshield wiper from freezing to a windshield of a vehicle may be broadly described as comprising at least one sensor for determining an ambient condition of the vehicle, a control module for receiving information from the at least one sensor and applying power from a battery via a control circuit to a motor for driving the windshield wiper in response to the information, and a sensor for sensing current drawn by the motor, wherein the control module compares an initial sensed current drawn by the motor when power is initially switched to the motor to a subsequent sensed current drawn by the motor a period after power is initially switched to the motor, and periodically reverses a polarity of the power from the battery via the control circuit to the motor reversing a direction of the motor for driving the windshield wiper until the subsequent sensed current is less than the initial sensed current.

In still another possible embodiment, the control circuit is an H-bridge circuit.

In yet another possible embodiment, the at least one sensor includes at least one of a temperature sensor, a humidity sensor, a rain sensor, a camera, a radio, a computer, a receiver, and a mobile device.

In other possible embodiments, the circuits for preventing a windshield wiper from freezing to a windshield described above are incorporated into a vehicle.

In the following description, there are shown and described several embodiments of a method of preventing a windshield wiper from freezing to a windshield of a vehicle and a related circuit. As it should be realized, the methods and circuits are capable of other, different embodiments and their several details are capable of modification in various, obvious aspects all without departing from the methods and assemblies as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the vehicle, circuits, and method and together with the description serve to explain certain principles thereof. In the drawing figures.

Reference will now be made in detail to the present preferred embodiments of the method of preventing a windshield wiper from freezing to a windshield of a vehicle and related circuits, examples of which are illustrated in the accompanying drawing figures, wherein like numerals are used to represent like elements.

DETAILED DESCRIPTION

Figure 1:
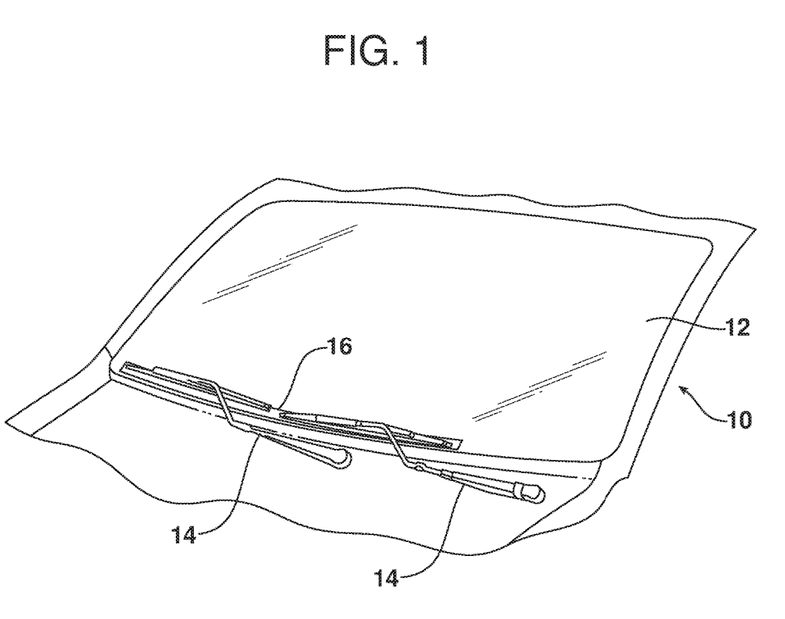
FIG. 1 is a is partial perspective view of a vehicle showing a windshield and a pair of windshield wipers positioned in a non-use or parked position.

Reference is now made to FIG. 1 which illustrates a partial vehicle 10 and a windshield 12. A pair of windshield wipers 14 are shown in an initial stationary position within a windshield wiper park zone 16. The windshield wiper park zone 16 is an area where the windshield wipers 14 generally reside in the "OFF" state of the windshield wipers. That is to say, power is not applied to the windshield wipers whether in a slow, intermittent, fast or any other mode of operation. Although a pair of windshield wipers are used in the described embodiment, other embodiments could use one or more than two windshield wipers. Also, the initial stationary position of the windshield wipers 14 in the "OFF" state could be located outside of the windshield wiper park zone 16.

As is known, windshield wipers 14 can freeze to a windshield 12 in the parked position when adverse ambient conditions are present, for example, when precipitation is falling and/or an ambient temperature of the vehicle is near or below zero degrees. Traditionally, vehicle operators have relied primarily on physical manipulation to unfreeze or unstick the windshield wipers 14 or on a front windshield defroster (not shown) which blows warm air through a vent onto the windshield 12 in a defrost mode. Unfortunately, the warm air often contacts the windshield 12 above the windshield wiper park zone 16 where the windshield wipers 14 typically reside when not in use. In other words, the defroster only warms a portion of the windshield 12 excluding the windshield wiper park zone 16. Again, the windshield 12 may be substantially cleared of snow and/or ice by the defroster but the windshield wipers 14 may remain frozen to the windshield within the windshield wiper park zone 16.

Figure 2:
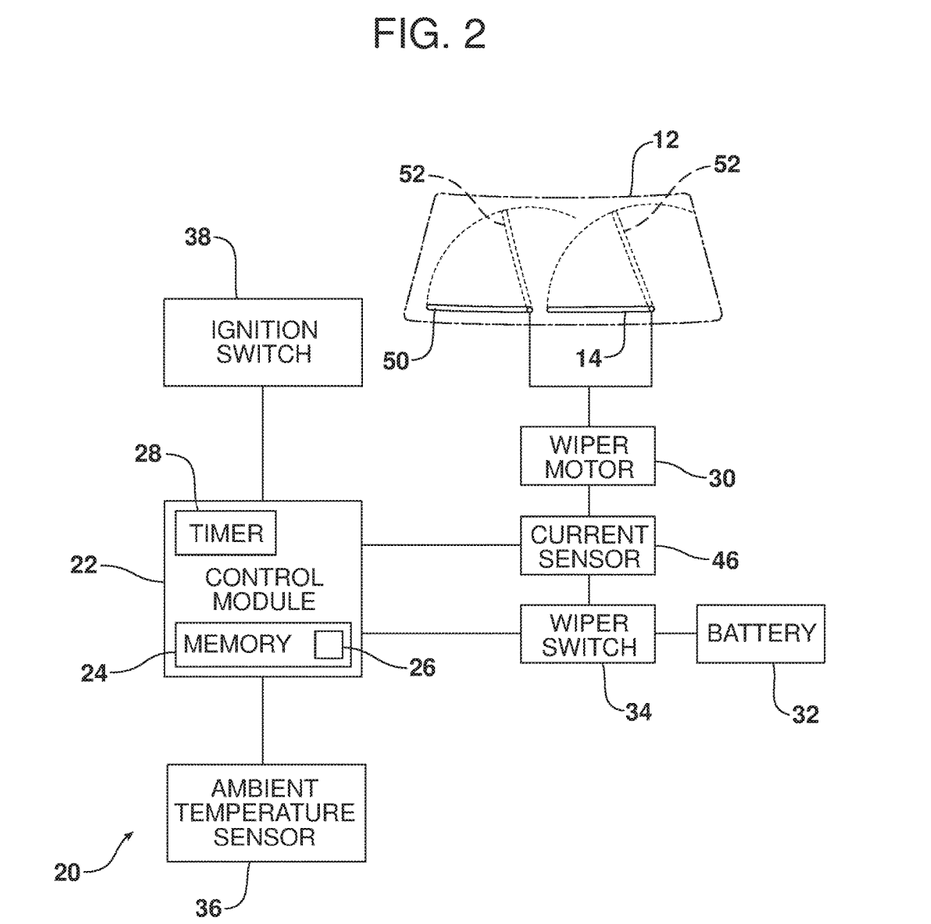
FIG. 2 is a is a block diagram of an exemplary circuit including a control module for preventing a windshield wiper from freezing to a windshield of a vehicle.

FIG. 2 is a schematic diagram of an exemplary circuit 20, including a control module 22, for preventing the windshield wipers 14 from freezing to the windshield 12 of the vehicle 10. As shown, the control module 22 includes a memory 24 wherein a windshield wiper control program 26 is stored, and an internal timer 28. The timer 28 is utilized to determine elapsed times, among other tasks, as will be described in more detail below. In the described embodiment, the circuit 20 provides power to a wiper motor 30 for driving the windshield wipers 14 under certain conditions to prevent freezing to the windshield 12. As shown, power from a battery 32 (e.g., +/−12 volts) or other power source is provided to the motor 30 via a wiper switch 34. In the described embodiment, the switch 34 is a wiper control circuit controlled by the control module 22. The control module 22 in the described embodiment is a body control module or BCM.

In the exemplary circuit 20, the control module 22 receives information relating to an ambient condition of the vehicle 10. The information may be received on a continuous, a periodic, or even a random basis when the vehicle 10 is in an "OFF" state and is used to determine whether to turn the windshield wipers 14 from the "OFF" state to an "ON" state to prevent their freezing to the windshield 12. The information may be provided to the control module 22 by any one or more sensors or information systems either directly or through one or more control modules utilizing an internal communications network that interconnects components inside the vehicle (e.g., a controller area network (CAN) or local interconnect network (LIN)). In the embodiment shown in FIG. 2, the information is provided directly by an ambient temperature sensor 36. Other embodiments may utilize a different temperature sensor, a humidity sensor, a rain sensor, a camera mounted to the vehicle or otherwise, a computer, a radio, a receiver, a mobile device, weather related applications, and/or data from telematics and/or vehicle-to-external (V2X) communications systems. Any one or more of the above-listed sources of information, or any source of information, may be utilized to obtain information relating to an ambient condition of the vehicle 10 for use in determining whether to turn the windshield wipers 14 from the "OFF" state to the "ON" state to prevent their freezing to the windshield 12.

In the described embodiment, an output ($T_A$) of an ambient temperature sensor 36 indicative of an ambient temperature of the vehicle 10 is utilized. The temperature sensor output ($T_A$) is received by the control module 22 on a continuous basis when an ignition switch 38 is in an "OFF" position. In other embodiments, information may be received in response to certain events. For example, the temperature sensor output ($T_A$) could be received an elapsed period of time following the ignition switch changing to the "OFF" position and periodically thereafter, or after a rain sensor determines the presence of precipitation. In other words, the temperature sensor output ($T_A$) could be received from the temperature sensor 36 at any time throughout the process. In such a scenario, the control module 22 may change the windshield wipers state from "OFF" to "ON" by switching power from the battery 32 to the wiper motor 30.

Figure 3:
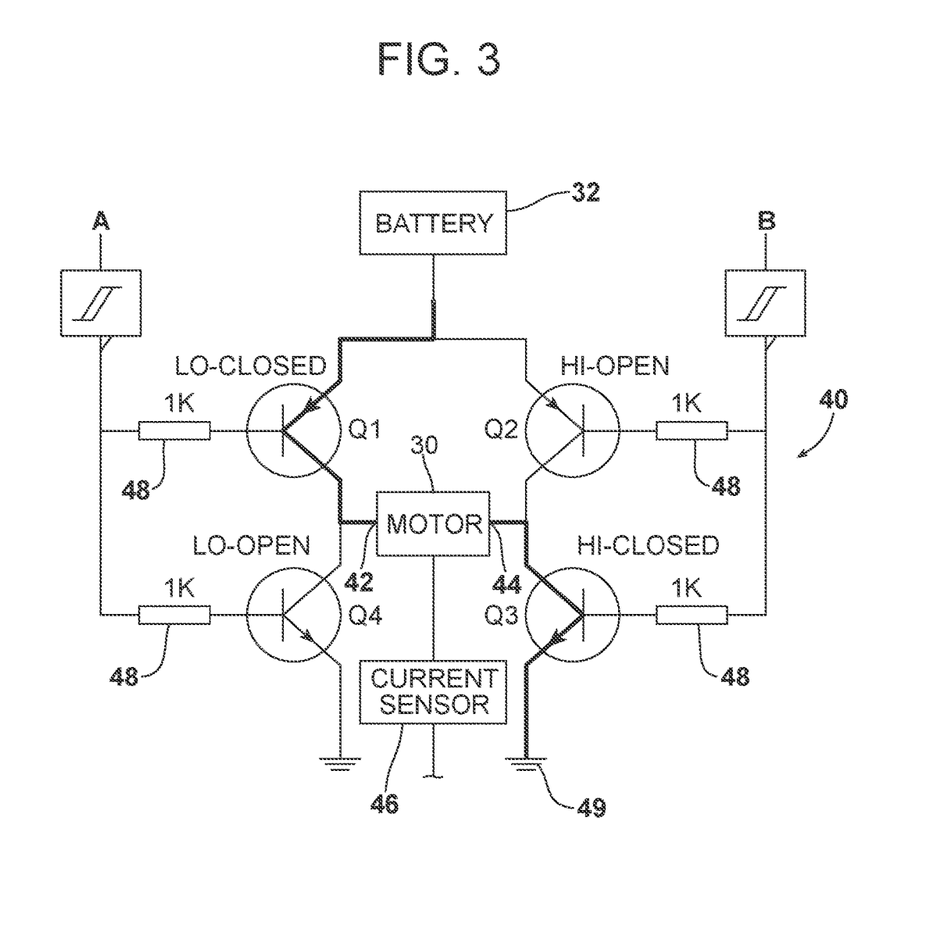
FIG. 3 is a schematic of an H-bridge control circuit.

As shown in FIG. 3, the switch 34 in the described embodiment is a control circuit 40 used to reverse a polarity of the motor 30. More specifically, the control circuit 40 is an H-bridge circuit. This allows the windshield wipers 14 to be driven in a first, or forward, direction and subsequently in a second, or reverse, direction. In other words, the windshield wipers 14 may be driven in the first direction, reversed and driven in the second direction, and then reversed and driven in the first direction, and so on.

The H-bridge circuit n is an electronic circuit that enables a voltage to be applied across a load in either direction. As is known in the art, H-bridge circuits are commonly used to allow DC motors to run forwards and backwards, i.e., to reverse the polarity/direction of the motor. In the described embodiment, the H-bridge circuit 40 is a solid-state circuit although switches, relays, transistors, or MOSFETs may be utilized in other embodiments. Other control circuit types may be used as well to reverse direction of the motor. Although not shown in the exemplary H-bridge circuit, protection may be added including, for example, Schottky diodes and/or filtering capacitors to absorb voltage spikes from the motor. Even more, a bridge driver chip may be utilized to drive the circuit rather than interfacing directly with the control module or microcontroller.

The described H-bridge circuit 40 includes four switching elements, namely, NPN and PNP transistors Q1, Q2, Q3, and Q4. As suggested above, bi-polar or FET transistors may be utilized. The top-end of the H-bridge circuit 40 is connected to the battery 32 and the bottom-end is grounded. In general all four switching elements Q1-Q4 can be turned on and off independently though there are some restrictions. The wiper motor 30 is connected at a first lead 42 between transistors Q1 and Q4 and at a second lead 44 between Q2 and Q3. A current sensor 46 senses a current drawn by the wiper motor 30 during operation. Although not shown, an output of the current sensor 46 is provided to the control module 22 for use in controlling a direction of the motor as will be described in greater detail below.

The basic operating mode of an H-bridge circuit 40 is straightforward. Control signals A and B are provided to the H-bridge circuit 40 via 1000 ohm resistors 48 in the described embodiment. When control signal A is high and control signal B is low, transistors Q1 and Q3 are turned on. As shown in FIG. 3, the left lead 42 of the wiper motor 30 will be connected to the battery 32 via transistor Q1, while the right lead 44 is connected to ground 49 via transistor Q3. Current starts flowing through the wiper motor 30 which energizes the motor in the forward direction and the motor shaft starts rotating. If transistors Q2 and Q3 are turned on by bringing control signal A low and control signal B high, the reverse will happen and the wiper motor 30 is energized in the reverse direction and the shaft will start rotating in the opposite direction.

Figure 4:
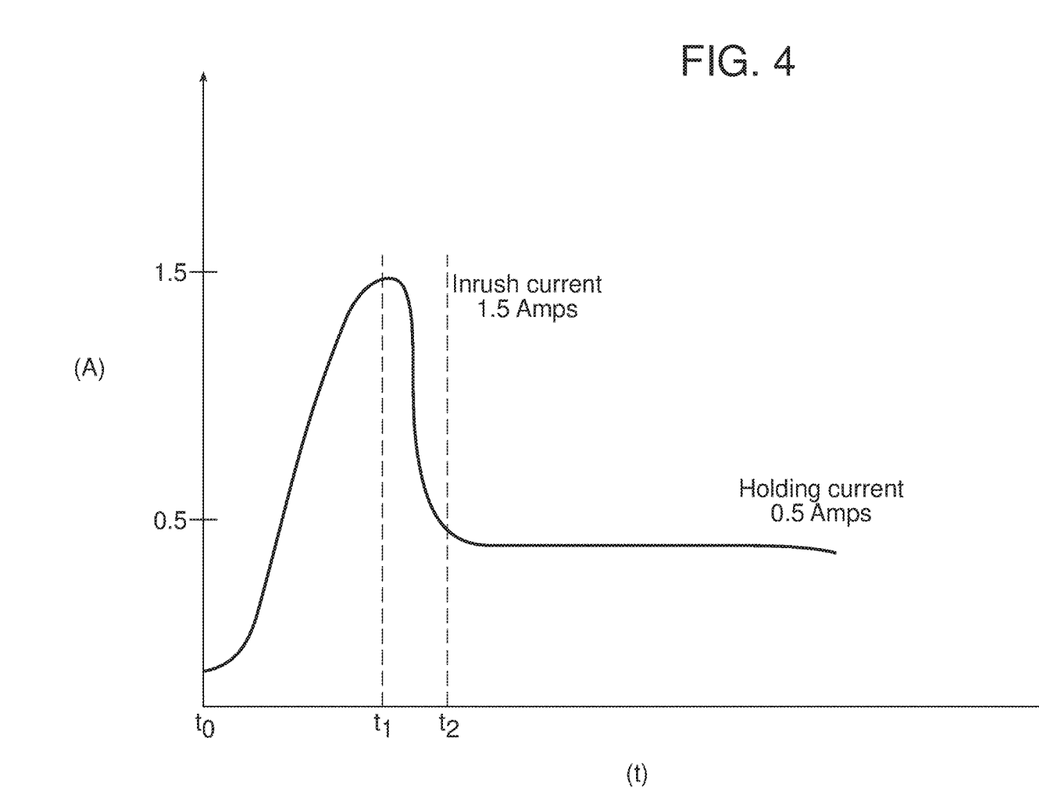
FIG. 4 is a graph of a typical motor current draw at startup including an inrush current and a holding current.

In the described embodiment, the control module 22 further monitors current drawn by the motor 30 via current sensor 46. As shown in FIG. 4, current drawn by the wiper motor 30 when power is initially switched to the motor is high (approximately 1.5 A). This high initial current is commonly referred to as an inrush current. The inrush current is high at this time ($t_1$) due to the current draw required to overcome the inertia of the windshield wipers 14 in the initial stationary state as shown by reference numeral 50 in FIG. 2. Once the windshield wipers 14 begin to move, as shown by reference numeral 52, the current drawn drops to about one-third of the inrush current as shown in FIG. 4. This lower or steady state current is referred to as a holding current.

In accordance with the invention, if the initial sensed current drawn by the wiper motor 30 when power is initially switched to the motor (or a short time $t_1$ thereafter) is similar to a subsequent sensed current drawn by the motor a period ($P_1$) after power is initially switched to the motor, then the inference is that the windshield wipers 14 are frozen to the windshield 12 or obstructed by frozen precipitation built up on the windshield. In such a scenario, the control module 22 periodically alters the direction of the windshield wipers 14 utilizing the H-bridge circuit 40. As described above, the H-bridge circuit 40 reverses the polarity of the power applied to the wiper motor 30 for driving the windshield wipers 14 in the first direction or the second direction.

In the described embodiment, rapid, short duration pulses are provided to the H-bridge circuit 40 driving the wiper motor 30 in subsequent forward and reverse directions. This action generates vibrations intended to free the windshield wipers 14 from the windshield 12 or the frozen precipitation. In the described embodiment, this scenario is continued until a subsequent sensed current is less than the initial sensed current indicating the windshield wipers 14 are moving freely along the windshield 12. At that time, the rapid reversing of the wiper motor 30 is terminated and power is removed from the motor when the windshield wipers 14 reach the initial position designated 50. In other embodiments, the wiper motor 30 may be driven in the subsequent forward and reverse directions only for a limited period of time in order to prevent damage to the wiper motor 30 or excessive drain on the battery 32.

In still other embodiments depending on the mechanical linkages used to move the windshield wipers 14, the wiper motor 30 may be reversed one additional time to allow the windshield wipers to return to the initial position. Similarly, the windshield wipers 14 may be stopped wherever they are when the subsequent sensed current is less than the initial sensed current and power is removed from the wiper motor 30.

A period of time after power is removed from the wiper motor 30 or the windshield wipers 14 return to the initial stationary position, control module 22 may again change the windshield wipers state from "OFF" to "ON" by switching power from the battery 32 to the wiper motor 30 if the information received relating to the ambient condition indicates an adverse ambient condition and/or precipitation as described above. In other words, the sequence repeats itself on a periodic basis if the ambient conditions are adverse at the end of the period, or simply on a periodic basis. In other embodiments, the sequence repeats itself only when the ambient conditions change from an acceptable to an adverse condition. The control module 22 receives the information concerning the ambient condition and initiates a sequence only when the ambient conditions are determined to be adverse regardless of the period of time elapsed since the prior sequence.

If the initial sensed current drawn by the wiper motor 30 when power is initially switched to the motor (or a short time $t_1$ thereafter) is higher than a subsequent sensed current drawn by the motor a period ($P_1$) after power is initially switched to the motor, on the other hand, then the windshield wipers 14 are not frozen to the windshield 12 and the windshield wipers can return to an "OFF" state. As shown in FIG. 4, the period ($P_1$) is the time between $t_2$ and $t_1$. In this instance, power is removed from the wiper motor 30 when the windshield wipers reach the initial position designated 50. Alternately, the windshield wipers 14 may be stopped wherever they are when the subsequent sensed current is less than the initial sensed current and power is removed from the wiper motor 30.

If the information concerning the ambient condition of the vehicle 10 remains adverse or indicates precipitation a period of time after the windshield wipers 14 return to the initial stationary position, then the wiper motor 30 is again turned to the "ON" state and the windshield wipers are driven in a first direction as described above. If the information concerning the ambient condition of the vehicle 10 does not remain adverse or indicate precipitation a time period after the windshield wipers 14 return to the initial stationary position, then a subsequent time period is determined using the timer 28 and the information is again poled to determine the existence of an adverse ambient condition. If the ambient conditions remain favorable, no further action is required.

In the described embodiment, two degrees Celsius is considered near zero degrees Celsius. However, other temperatures could be utilized. In addition, the control module 22 may also filter the sensed temperature through algorithms designed to correct possible inaccuracies in the sensed ambient temperature. The sensed ambient temperature could include inaccuracies due to positioning the ambient temperature sensor 36 within an engine compartment of the vehicle 10 or due to the speed the vehicle is travelling creating a wind chill at the windshield 12.

Figure 5A:
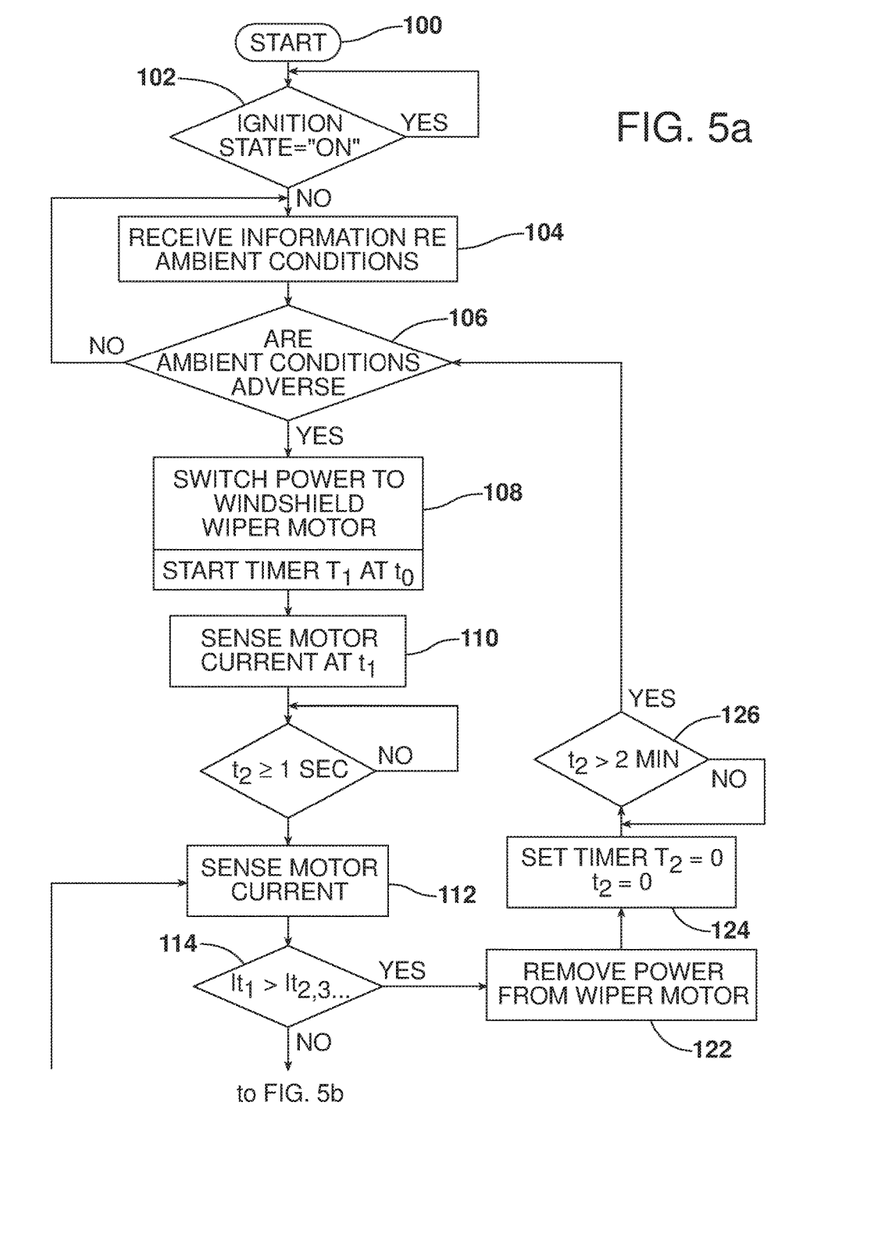
FIGS. 5a and 5b are a flow chart schematic for preventing a windshield wiper from freezing to a windshield of a vehicle.
Figure 5B:
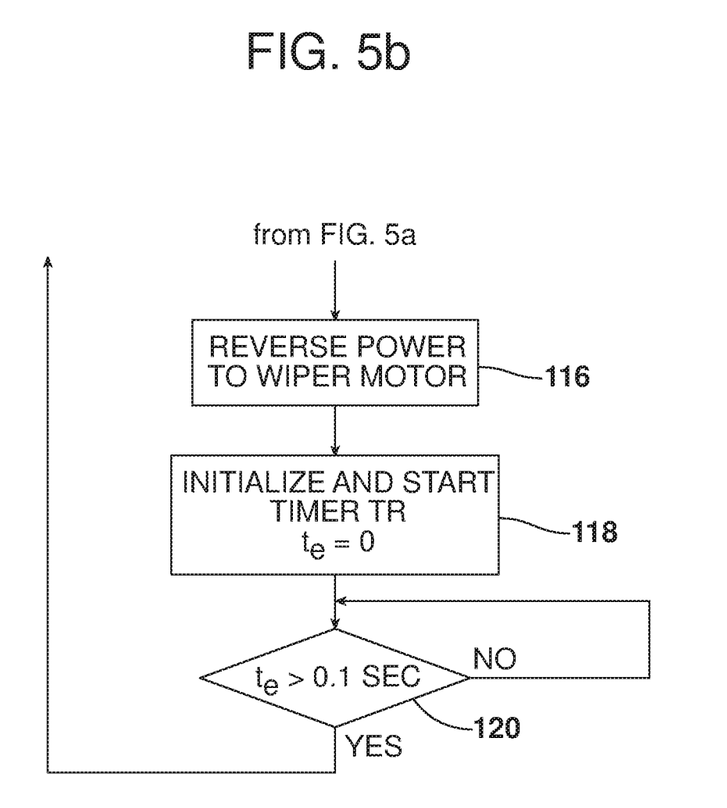

The steps utilized in the described embodiment will now be described with reference to FIG. 5. FIG. 5 is a flowchart of operational control of the wiper motor 30 of the vehicle 10 according to the described embodiment. The processing sequence related to operational control of the wiper motor 30 of the vehicle 10 according to the described embodiment is executed by a processor (not shown) of control module 22 as a program 26 stored in memory 24.

Upon initiation of the sequence at Step 100, an "ON" or "OFF" state of the ignition switch 38 is determined at Step 102. If the ignition switch 38 is in the "ON" state, then the sequence returns to Step 102 until the ignition switch is in the "OFF" state. Then, control module 22 determines whether information received from the ambient temperature sensor 36 concerning ambient conditions of the vehicle at Step 104 indicates the presence of adverse ambient conditions at Step 106. If the ambient conditions are not adverse, then the sequence monitors the received information until the ambient conditions are determined to be adverse at Step 106.

If the ambient conditions are adverse, power from battery 32 is applied to the wiper motor 30 and a timer $T_1$ is initiated at Step 108. The current drawn by the wiper motor 30 is initially sensed a short period thereafter at $t_1$ to determine an inrush current ($I_{t1}$), as shown in FIG. 4, at Step 110. A period ($P_1$) after power is initially switched to the wiper motor 30, a subsequent current ($I_{r2}$) drawn by the wiper motor 30 is sensed by current sensor 46 at Step 112. In the described sequence, the period ($P_1$) is 1 second but any period may be utilized.

If the initial sensed current ($I_{r1}$) drawn by the wiper motor 30 when power is initially switched to the motor (or a short time $t_1$ thereafter) is not greater than the subsequent sensed current ($I_{r2}$) drawn by the motor the period ($P_1$) after power is initially switched to the motor as determined in Step 114, then the inference is that the windshield wipers 14 are frozen to the windshield 12 or obstructed by frozen precipitation built upon the windshield 12. In such a scenario, the control module 22 periodically alters the direction of the windshield wipers 14 utilizing the H-bridge circuit 40 at Step 116. As described above, the H-bridge circuit 40 reverses the polarity of the power applied to the wiper motor 30 for driving the windshield wipers 14 in the first direction or the second direction.

In the described embodiment, power to the wiper motor 30 is initially reversed at Step 116 and a timer ($T_R$) is initialized ($t_e$=0) and started at Step 118. After an elapsed time ($t_e$>0.1 seconds) is determined to have passed at Step 120, a subsequent current drawn by the wiper motor 30, at time t3, is again sensed at Step 112. The subsequent current ($I_{r3}$) is again compared to the initial sensed current ($I_{r1}$) at Step 114. If the initial sensed current ($I_{r1}$) drawn by the wiper motor 30 is not greater than the subsequent sensed current ($I_{r3}$) drawn by the motor as determined in Step 114, then power to the wiper motor 30 is again reversed at Step 116 and a timer ($T_R$) is initialized ($t_e$=0) and started at Step 118. These steps are repeated in the described embodiment driving the wiper motor 30 in subsequent forward and reverse directions until a subsequent current (whether $I_{r2}$, $I_{r3}$, or $I_{tn}$) is determined to be less than the initial sensed current ($I_{r1}$) at Step 114.

If the initial sensed current is higher than a subsequent sensed current, on the other hand, then the windshield wipers 14 are not frozen to the windshield 12 and the windshield wipers can return to an "OFF" state. In other words, power is removed from the wiper motor 30 at Step 122. A period of time (e.g., 2 minutes) after power is removed from the wiper motor 30 at Step 122, control module 22 may again change the windshield wipers state from "OFF" to "ON" by switching power from the battery 32 to the wiper motor 30 at Step 108 if the information received relating to the ambient condition indicates an adverse ambient condition and/or precipitation at Step 106. In other words, the sequence repeats itself on a periodic basis if the ambient conditions are adverse at the end of the period, or simply on a periodic basis. Specifically, a timer T2 is initialized at Step 124 when power is removed from the wiper motor 30 at Step 122. Once it is determined at Step 126 that two minutes has elapsed since initiation of the timer T2, then the control module determines whether the ambient conditions are adverse at Step 106 and switches power to the wiper motor 30 at Step 108, as described above, when the conditions are determined to be adverse. If the ambient conditions are not determined to be adverse, the sequence loops to Step 104 until the received information concerning ambient conditions indicates that the conditions are adverse.

In summary, numerous benefits result from the method of preventing a windshield wiper from freezing to a windshield of a vehicle as illustrated in this document. The method is capable of actuating a windshield wiper when an ambient condition of a vehicle is determined to be adverse in order to prevent the windshield wiper from freezing to the windshield or to unstick the windshield wiper from the windshield and/or precipitation built up on the windshield. The foregoing has been presented for purposes of illustration and description. It is not intended to be exhaustive or to limit the embodiments to the precise form disclosed. For example, a washer spray system may be activated in addition to the windshield wipers, if needed, to spray a washer fluid, which has a lower freezing temperature than water, onto the windshield to assist in preventing freezing. When the washer spray touches the windshield wipers, the washer fluid dissolves any frozen precipitation on the windshield wipers and/or prevents precipitation buildup at least for a period of time. Obvious modifications and variations are possible in light of the above teachings. All such modifications and variations are within the scope of the appended claims when interpreted in accordance with the breadth to which they are fairly, legally and equitably entitled.

What is claimed:

1. A method of preventing a windshield wiper from freezing to a windshield of a vehicle, comprising the steps of:
   receiving information relating to an ambient condition of the vehicle;
   switching power to a motor for driving the windshield wiper in a first direction if the received information indicates an adverse ambient condition of the vehicle;
   sensing current drawn by said motor;
   comparing an initial sensed current drawn by said motor when power is initially switched to said motor to a subsequent sensed current drawn by said motor a period after power is initially switched to said motor; and
   periodically reversing said motor for driving the windshield wiper in a second direction or the first direction until the subsequent sensed current is less than the initial sensed current, wherein the step of periodically reversing said motor includes the step of reversing a polarity of the power applied to said motor for driving the windshield wiper in the first direction or the second direction.

2. The method of preventing a windshield wiper from freezing to a windshield of a vehicle of claim 1, wherein an initial subsequent sensed current is sensed after an initial period sufficient in duration to allow the windshield wiper to move from an initial stationary position.

3. The method of preventing a windshield wiper from freezing to a windshield of a vehicle of claim 2, wherein the step of periodically reversing said motor is terminated after a first reversing step when the initial subsequent sensed current is less than the initial sensed current, and further comprising the step of switching power from said motor when the windshield wiper returns to the initial stationary position.

4. The method of preventing a windshield wiper from freezing to a windshield of a vehicle of claim 3, wherein the step of receiving information includes at least one of the steps of monitoring a temperature sensor, monitoring a humidity sensor, monitoring a rain sensor, monitoring information from a camera, monitoring information from weather related applications, and monitoring data from telematics or vehicle-to-external communications systems.

5. The method of preventing a windshield wiper from freezing to a windshield of a vehicle of claim 1, wherein the step of periodically reversing said motor is terminated when the subsequent sensed current is less than said initial sensed current, and further comprising the step of switching power from said motor when the windshield wiper returns to an initial stationary position.

6. The method of preventing a windshield wiper from freezing to a windshield of a vehicle of claim 5, wherein the step of receiving information includes at least one of the steps of monitoring a temperature sensor, monitoring a humidity sensor, monitoring a rain sensor, monitoring information from a camera, monitoring information from weather related applications, and monitoring data from telematics or vehicle-to-external communications systems.

7. The method of preventing a windshield wiper from freezing to a windshield of a vehicle of claim 5, further comprising the step of switching power to said motor for driving the windshield wiper in the first direction if the received information indicates precipitation at a period of time after the windshield wiper returns to the initial stationary position.

8. A method of preventing a windshield wiper from freezing to a windshield of a vehicle, comprising the steps of:
driving the windshield wiper in a first direction;
sensing current drawn by a motor for driving the windshield wiper;
comparing an initial sensed current to a subsequent sensed current; and
periodically reversing a direction the windshield wiper is driven until the subsequent sensed current is less than the initial sensed current, wherein the step of driving the windshield wiper in the first direction includes driving the windshield wiper from an initial stationary position, and wherein an initial subsequent sensed current is a holding current sensed after an initial inrush current sufficient to move the windshield wiper from the initial stationary position.

9. The method of preventing a windshield wiper from freezing to a windshield of a vehicle of claim 8, wherein the step of periodically reversing said motor is terminated after a first reversing step when the initial subsequent sensed current is less than the initial sensed current.

10. The method of preventing a windshield wiper from freezing to a windshield of a vehicle of claim 9, further comprising the step of receiving information relating to an ambient condition of the vehicle, and wherein the step of driving the windshield wiper in the first direction occurs only if the information received relates to an adverse ambient condition of the vehicle.

11. The method of preventing a windshield wiper from freezing to a windshield of a vehicle of claim 8, wherein the step of periodically reversing said motor is terminated when the subsequent sensed current is less than the initial sensed current.

12. The method of preventing a windshield wiper from freezing to a windshield of a vehicle of claim 11, further comprising the step of stopping the windshield wiper upon its return to the initial stationary position following termination of the step of periodically reversing said motor.

13. The method of preventing a windshield wiper from freezing to a windshield of a vehicle of claim 8, further comprising the step of receiving information relating to an ambient condition of the vehicle, and wherein the step of driving the windshield wiper in the first direction occurs only if the information received relates to an adverse ambient condition of the vehicle.

14. The method of preventing a windshield wiper from freezing to a windshield of a vehicle of claim 13, wherein the step of receiving information includes at least one of the steps of monitoring a temperature sensor, monitoring a humidity sensor, monitoring a rain sensor, monitoring information from a camera, monitoring information from weather related applications, and monitoring data from telematics or vehicle-to-external communications systems.

15. A circuit for preventing a windshield wiper from freezing to a windshield of a vehicle comprising:
at least one sensor for determining an ambient condition of the vehicle;
a control module for receiving information from said at least one sensor and applying power from a battery via a control circuit to a motor for driving the windshield wiper in response to the information; and
a sensor for sensing current drawn by said motor,
wherein said control module compares an initial sensed current drawn by said motor when power is initially switched to said motor to a subsequent sensed current drawn by said motor a period after power is initially switched to said motor, and periodically reverses a polarity of the power from said battery via said control circuit applied to said motor for driving the windshield wiper in the first direction or the second direction until the subsequent sensed current is less than the initial sensed current.

16. The circuit for preventing a windshield wiper from freezing to a windshield of a vehicle of claim 15, wherein said control circuit is an H-bridge circuit.

17. The circuit for preventing a windshield wiper from freezing to a windshield of a vehicle of claim 15, wherein the at least one sensor includes at least one of a temperature sensor, a humidity sensor, a rain sensor, a camera, a radio, a computer, a receiver, and a mobile device.

18. A vehicle incorporating the circuit for preventing a windshield wiper from freezing to a windshield of claim 15.

19. A method of preventing a windshield wiper from freezing to a windshield of a vehicle, comprising the steps of:
receiving information relating to an ambient condition of the vehicle;
switching power to a motor for driving the windshield wiper in a first direction if the received information indicates an adverse ambient condition of the vehicle;
sensing current drawn by said motor;
comparing an initial sensed current drawn by said motor when power is initially switched to said motor to a subsequent sensed current drawn by said motor a period after power is initially switched to said motor; and
periodically reversing said motor for driving the windshield wiper in a second direction or the first direction until the subsequent sensed current is less than the initial sensed current, wherein an initial subsequent sensed current is sensed after an initial period sufficient in duration to allow the windshield wiper to move from an initial stationary position, and the step of periodically reversing said motor is terminated after a first reversing step when the initial subsequent sensed current is less than the initial sensed current, and further comprising the step of switching power from said motor when the windshield wiper returns to the initial stationary position.

20. The method of preventing a windshield wiper from freezing to a windshield of a vehicle of claim 19, wherein the step of receiving information includes at least one of the steps of monitoring a temperature sensor, monitoring a humidity sensor, monitoring a rain sensor, monitoring information from a camera, monitoring information from weather related applications, and monitoring data from telematics or vehicle-to-external communications systems.

* * * * *